US008666882B2

(12) United States Patent
Goulet

(10) Patent No.: US 8,666,882 B2
(45) Date of Patent: Mar. 4, 2014

(54) COMPUTERIZED MORTGAGE FORECLOSURE-CAPPING SYSTEM

(76) Inventor: Mary Elizabeth Goulet, McLean, VA (US)

( * ) Notice: Subject to any disclaimer, the term of this patent is extended or adjusted under 35 U.S.C. 154(b) by 0 days.

(21) Appl. No.: 13/303,788

(22) Filed: Nov. 23, 2011

(65) Prior Publication Data

US 2013/0132266 A1    May 23, 2013

(51) Int. Cl.
*G06Q 40/00* (2012.01)
(52) U.S. Cl.
USPC .......................................................... 705/38
(58) Field of Classification Search
USPC ................................................. 705/38, 36 R
See application file for complete search history.

(56) References Cited

U.S. PATENT DOCUMENTS

| | | | |
|---|---|---|---|
| 2008/0201190 A1* | 8/2008 | Compton et al. ................. | 705/8 |
| 2009/0150300 A1* | 6/2009 | Cherry et al. ................... | 705/80 |
| 2010/0274737 A1 | 10/2010 | Livermore .................. | 705/36 R |
| 2010/0293092 A1 | 11/2010 | Voltz, III ......................... | 705/39 |
| 2011/0137811 A1 | 6/2011 | Patel ............................ | 705/313 |
| 2011/0238565 A1 | 9/2011 | Cznadel .......................... | 705/38 |
| 2011/0258101 A1 | 10/2011 | Albertelli ........................ | 705/37 |
| 2011/0270779 A1 | 11/2011 | Showalter ................... | 705/36 R |

OTHER PUBLICATIONS

Vice Chairman Donald L. Kohn, At the Forum on Great Decisions in the Economic Crisis, College of Wooster, Wooster, Ohio Apr. 3, 2009.*
EIR Testifies on LaRouche's HBPA Solution to Crisis by Anita Gallagher, Dec. 14, 2007.*
Brunekreeft, Gert. Local versus global price cap: A comparison of foreclosure incentives. No. 36. Diskussionsbeiträge//Institut für Verkehrswissenschaft und Regionalpolitik, 1997.*
Johnson, Creola. "Stealing the American Dream: Can Foreclosure-Rescue Companies Circumvent New Laws Designed to Protect Homeowners from Equity Theft." Wis. L. Rev. (2007): 649.*
Giusto, Michael. "Mortgage Foreclosure for Secondary Breaches: A Practitioners Guide to Defining Security Impairment." Cardozo L. Rev. 26 (2004): 2563.*
Foote, Christopher, et al. "Reducing foreclosures: No easy answers." NBER Macroeconomics Annual 2009, vol. 24. University of Chicago Press, 2010. 89-138.*
Letter dated Jul. 22, 2009 from Michael J. Heid, Co-President, Wells Fargo Home Mortgage to Hon. Shaun Donovan, Secretary, Dept. of Housing and Urban Development.
P. Pearlstein, Surviving the foreclosure crisis, Washington Lawyer, Jan. 2009, pp. 32-39.
"Underwater borrowers in America," The Economist, Apr. 3, 2010, p. 78.
"Mortgage losses," The Economist, Feb. 7, 2009, pp. 63-64.
"Economics focus/ A helping hand to homeowners," The Economist, Oct. 25, 2008, p. 92.
Z. Goldfarb et al., "U.S. to lenders: No moratorium, but fix the mess," The Washington Post, Oct. 14, 2010, A1.
Z. Goldfarb et al., "Foreclosure logjam threatens Fannie, Freddie," The Washington Post, Oct. 12, 2010, A12.
A. Cha et al., "States to initiate joint foreclosure probe," The Washington Post, Oct. 13, 2010, A13.
B. Dennis et al., "Additional states freeze all foreclosures," The Washington Post, Oct. 6, 2010, A15.
A. Cha, "Lenders told to review foreclosure procedures," The Washington Post, Oct. 1, 2010, A17.

* cited by examiner

*Primary Examiner* — Hani M Kazimi
*Assistant Examiner* — Chuks Onyezia
(74) *Attorney, Agent, or Firm* — Whitham Curtis Christofferson & Cook, PC

(57) ABSTRACT

Computerized capping of mortgage foreclosures.

14 Claims, 2 Drawing Sheets

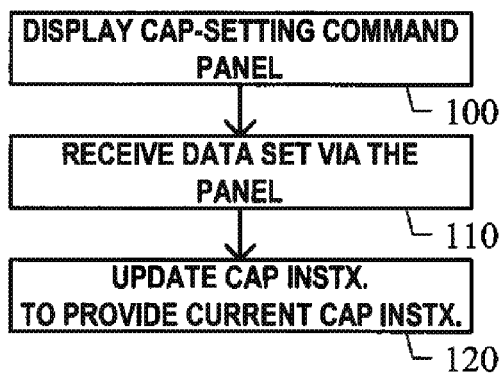
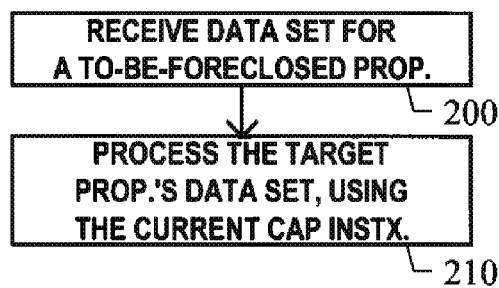
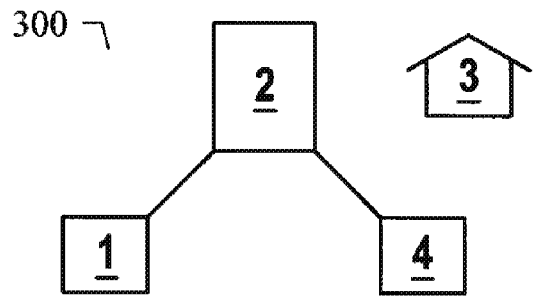
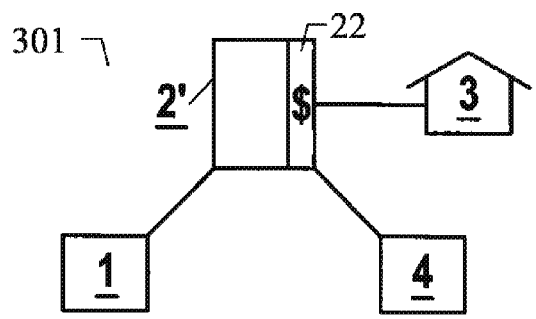

FOR ZIP CODE << $Z_n$ >>,
ENTER THE MONTHLY CAP
ON FORECLOSURES:

— 11

ARE ANY HOMES EXEMPT
FROM THIS CAP?

○ NO

● YES

○ NO CAP FOR
       SQ. FT. OVER  — 12

○ NO CAP IF BORROWER
       LIVES ELSEWHERE
       AT PRESENT

US 8,666,882 B2

COMPUTERIZED MORTGAGE FORECLOSURE-CAPPING SYSTEM

FIELD OF THE INVENTION

The invention relates to automated handling and processing of data relating to mortgage foreclosures especially intended foreclosures.

BACKGROUND OF THE INVENTION

For various reasons—such as loose underwriting practices, disreputable mortgage loan originations, homeowners experiencing greater difficulty in replacing a lost job in the face of high unemployment, and many so-called "underwater" homeowners owing more on the mortgage debt for the home than the amount for which the home could be sold—in recent years the number of foreclosures in the US has become relatively large.

An omnibus-style foreclosure moratorium was put into place when Federal Housing Finance Agency ("FHFA") took over Fannie Mae and Freddie Mac in 2008, however, the moratorium was lifted several months later.

In early 2009, a government-backed foreclosure-prevention solution called Making Home Affordable Program or "HAMP" was attempted. Although some homeowners have avoided foreclosure and been helped through HAMP, generally the total number of mortgage modifications has been quite low compared to government projections as the program began.

Another aspect of the mortgage foreclosure crisis has been that, in about fall 2010, significant press coverage emerged of lender-side foreclosure practices such as so-called foreclosure affidavit robo-signing and other improper or suspect practices.

Policymakers and citizens have a spectrum of views as to what—if anything—should be done on certain foreclosure fact patterns. Even certain policymakers or citizens who are disinclined to want to "help" any particular family facing foreclosure and who may tend to be laissez-faire about letting each distressed or ejected family fend for itself, nonetheless may consider that to permit foreclosures in the aggregate, or for a certain region, to reach large numbers could be problematic and require intervention.

Solutions and tools are needed that are useable across a wide range of fact patterns, as well as that are useable to deal with a problematic foreclosures trend at various times during the crisis especially including relatively early if such a trend is emerging.

SUMMARY OF THE INVENTION

In one embodiment, the invention provides a computerized method for foreclosures processing with capping such as, e.g., monthly caps by zip code, monthly caps by servicer, etc.

In another embodiment, the invention provides a computerized method for foreclosures processing with capping, comprising: displaying a cap-setting command panel useable by an authorized cap-setter user; receiving a set of data via the cap-setting command panel; based on a received data set, updating a set of Cap Instructions to provide a current set of Cap Instructions; receiving, through a data intake mode, a set of data for a to-be-foreclosed property (such as, e.g., a data set that is received from a servicer or other party wanting to foreclose on a mortgage on the target property); and processing the received set of data for the target property according to the current set of Cap Instructions, wherein each displaying, data-receiving, updating and processing step is performed by a computer.

BRIEF DESCRIPTION OF THE FIGURES

FIG. 1 is a flow chart of steps performed by a computer in an inventive embodiment and relating to Cap Instructions.

FIG. 2 is a flow chart of steps performed by a computer in an inventive embodiment and which are specific to a particular distressed property.

FIG. 3 is a diagram of an exemplary inventive automated foreclosure-capping system 300.

FIG. 3A is a diagram of an exemplary inventive automated foreclosure-capping system 301 comprising a payment portal 22 useable by a homeowner residing at target property 3 to make a payment.

DETAILED DESCRIPTION

Figure 4:
FIG. 4 is an exemplary screen displayed on a computer device 1 to be used by a cap-setting official for cap-setting.

In the invention, a set of Cap Instructions, for capping a maximum number of home mortgage foreclosures in a certain time period across a certain defined set of homes, is stored by a computer. Preferably the Cap Instructions are updatable. In the invention, a home is defined in the data stored by the computer by, e.g., a US Postal Service street address, a unique identification number, etc. The number of Cap Instructions applicable to any given home at any given time may be zero, one or more than one. A set of homes may be defined, for purposes of the Cap Instructions, for example by geography (such as by Zip Code), by square footage, by number of bedrooms, by number of rooms, and by any other value that can be expressed quantitatively.

Referring to FIG. 1, steps are shown that preferably are performed by an inventive computerized system that practices a method for foreclosures processing with capping. The inventive system performs a step of displaying (100) a cap-setting command panel (such as a panel displayed on cap-setting computer device 1 in FIG. 3) useable by an authorized cap-setter user (such as, e.g., a high-level government official, such as a HUD official, a governor, etc.), followed by receiving (110) a set of data via the cap-setting command panel, followed by, based on a received data set, updating (120) a set of Cap Instructions to provide a current set of Cap Instructions.

Herein, "an authorized cap-setter user" refers to a computerized system's user who need not be a computer programmer.

A " cap-setting command panel" preferably is in plain language and useable by an authorized cap-setter user who is not a computer programmer.

When the computerized system is constructed to use updatable Cap Instructions, and where Cap Instructions are updatable by, for example a certain high-level government official or set of such officials, an advantage is relative simplicity for change of policy, whether by the same administration or a different administration. For example, a highest level of laissez-faire policy is represented by setting all Cap Instructions to an unreachably high number such as a number higher than the number of homes in the US which option may, e.g., be displayed to a cap-setting user in a form of a "no cap" choice; on the other extreme, a highest-level of home mortgage foreclosure moratorium is represented by setting all Cap Instructions to zero which option may, e.g., be displayed to a cap-setting user in a form of a "moratorium" choice. Preferably the inventive computerized system can receive from the cap-setting user zero and any whole-number selection. Preferably the inventive computerized system is constructed to receive user input of a cap-setter in a variety of access modes, such as by an access mode which receives the user's entry of a particular zip code, an access mode which receives the user's entry of a particular square footage number, an access mode which is a drop-down menu with particular geographic regions selectable, etc.

The invention is useable for a policymaker to influence how lender-side parties are likely to handle, or must handle, any given property, but without needing to have specific communications with a lender-side party on a property-by-property basis. For example, a policymaker who sets "by-servicer" caps low, can expect that a servicer would be more motivated to triage on their end which properties they submit for foreclosure and would avoid trying to foreclose on modest homes still occupied by the homeowner especially ones for which loss mitigation options have not been exhausted.

An inventive system optionally may be constructed to permits a cap-setting user to "generally select" a certain defined set of homes (such as homes greater than or less than a certain square footage), followed by permitting the cap-setting user to "exclude out" certain homes otherwise within that general category, such as by excluding homes in certain Zip Codes.

Referring to FIG. 2, steps are shown that preferably are performed by an inventive computerized system that practices a method for foreclosures processing with capping. The inventive computerized system performs a step of receiving (200), through a data intake mode, a set of data for a to-be-foreclosed property which is a target property (such as target property 3 in FIG. 3), followed by processing (210) the received set of data (from step 200) for the target property according to the current set of Cap Instructions (using the current Cap Instructions as most recently updated in step 120).

An example of a set of Cap Instructions is a first table that comprises zip codes and a second table that comprises servicers, wherein in the first table each zip code has a respective monthly cap associated therewith, and in the second table each servicer has a respective monthly cap associated therewith.

In the inventive methods, preferably the steps are practiced by a computerized system.

In the inventive methods, preferably the step of receiving data for a target property (a to-be-foreclosed property, such as target property 3 (FIG. 3)) is repeated for a plurality of target properties.

Preferably the inventive method is practiced in a robust computerized system that simultaneously receives data being entered by multiple servicers, and simultaneously receives data being entered by multiple representatives (such as employees, outside foreclosure counsel, etc.) of a servicer.

Preferably the inventive system is constructed using a table of authorized cap-setter users, which table is updatable, wherein the table includes at least one authorized cap-setter user, and may include a plurality of authorized cap-setter users. Preferably the inventive system provides for defining a set of privileges uniquely to each cap-setter user, such as privileges only to modify caps in a moratorium direction; privileges only with regard to a certain Zip Code range; privileges only for a certain state; privileges only for a certain city; etc.

The inventive automated foreclosure capping system may be constructed to include a notification feature so that, after data set has been received (200) and processed (210) for a target property 3, in addition to a report returned to whoever submitted the data set that was received in the receiving step (200), the system also mails or otherwise sends a notification (such as, e.g., a Notification that Proposed Foreclosure Still Under Investigation, Permission Not Granted) to at least one other person, such as, e.g., the homeowner of the target property, a court where the target property is located, etc.

Referring to FIG. 3 illustrating inventive system 300, computer device I is useable by a cap-setting official to enter cap instructions into a command panel, which after being entered are communicated to system 2 wherein cap instructions are stored. System 2 is accessible by at least one computer system 4 which is operated by a lender-side party, such as, e.g., a mortgage servicer which services a mortgage on target property 3 and/or by the mortgage servicer's representative such as by a foreclosure law firm.

Preferably capping system 300 comprises capping system 301 (FIG. 3A) in which system 2' comprises a payment portal 22 which is useable by a homeowner to make into system 301 a payment, which may be a partial payment, on his home which is target property 3. Payment portal 22 included in system 301 addresses the problem that has been known to occur of a struggling homeowner wanting to pay what he can and attempting to make some payment to a servicer, but having the payment rejected, blocked or returned by the servicer. Previously it has been difficult, if not impossible, for a homeowner once delinquent to make partial payments, and this situation of the homeowner not having paid anything over a period of time, albeit created by the servicer, seems to have contributed in some cases to cause some courts not to want to hear more and to be willing for the servicer to proceed to foreclose.

A system 2 or 2' preferably performs an outputting step in which a screen is output to a homeowner, wherein the screen is printable by a homeowner and may be useable by the homeowner, e.g., to provide to a court, servicer and/or other appropriate party to demonstrate that the foreclosure was capped and should not proceed yet, and/or to demonstrate a recent payment history relating to the property.

Referring to FIG. 4, an example of a screen that is displayed to a cap-setting official on computer device 1 is a screen that identifies a zip code Zn (wherein Zn is a zip code or a range of zip codes) and prompts the cap-setting official to enter a number, which is the monthly cap on foreclosures that is to apply to that zip code Zn, into a box 11.

Figure 5:
FIG. 5 is an exemplary screen displayed on a computer device 1 to be used by a cap-setting official for setting exemptions to a cap instruction.

Preferably an automated foreclosure-capping system also includes an instruction-receiving mechanism for receiving instructions about homes that are to be exempt from a cap that has been set such as a monthly cap set to cap foreclosures in a certain zip code or to cap foreclosures by a given servicer. One example of such a screen for receiving exemption instructions is in FIG. 5, where the system asks the cap-setter whether any homes are exempt for a particular cap that has been defined, and if the cap-setter indicates "yes", the cap-setter may select one or more clickable options such as "no cap for a home with an interior square footage over a number entered by the cap-setter into the input field 12, and/or no cap if the borrower lives elsewhere at present. The system may be constructed with additional or other exemptions choices.

Advantageously, the invention is useful as a tool towards ameliorating an ongoing mortgage foreclosure crisis.

It will be appreciated that the invention is not limited to what has been mentioned explicitly herein, and the invention may be practiced with certain modifications and details.

What I claim as my invention is:

1. A computerized method for foreclosures processing including capping, wherein capping is setting a maximum number of foreclosures; comprising:

displaying a cap-setting command panel that displays "enter monthly cap on foreclosures" text near a box that can receive as user input zero and any whole number;

receiving a set of data via the cap-setting command panel including receiving a whole-number cap set by the user;

based on a received data set, updating a set of Cap Instructions to provide a current set of Cap Instructions including the whole-number cap;

receiving, through a data intake mode, a set of data for a to-be-foreclosed property which is a target property, wherein the step of receiving data for the target property comprises receiving an identity of a servicer that submitted the record; receiving an identity of a loan owner on the mortgage for which the servicer submitted the record; receiving an indication of whether there is an FHA insurance interest for the target property; and receiving an indoors square footage of the target property;

processing the received set of data for the target property according to the current set of Cap Instructions, wherein each displaying, data-receiving, updating and processing step is performed by a computer.

2. The method of claim 1, comprising:

processing a received record for a target property for whether the target property has a square footage above a square footage threshold, and if so, issuing a freedom-of-action output message, and if not, performing further processing according to the current set of Cap Instructions.

3. The method of claim 1, for at least one predefined cap category selected from the group consisting of a by-servicer category and a by-zip code category, computing how many freedom-of-action indications have issued.

4. The method of claim 1, wherein a different cap for different servicers and/or a different cap for different zip codes is set.

5. The method of claim 1, comprising:

based on monthly caps wherein each monthly cap is a maximum number of foreclosures per month that has been set by the authorized user, computing capping indications; and outputting the capping indications computed based on monthly caps.

6. The method of claim 1, comprising outputting a cap indication selected from the group consisting of:

a "freedom-of-action" indication;

an "authorization to foreclosure NOT available at this time" indication.

7. The method of claim 1, comprising cross-matching a newly-received record for a target property against previously received records, and linking records for which the target property is cross-matched.

8. The method of claim 1, comprising operating a portal through which is received a status inquiry, from a court, regarding the target property.

9. The method of claim 1, comprising receiving, through a portal, a status inquiry for a property, and outputting a status for the property.

10. The method of claim 9, wherein the outputting step outputs a screen which is printable by a homeowner as evidence demonstrating that the foreclosure was capped and should not proceed yet.

11. The method of claim 1, wherein the record includes a Mortgage Type field with a set of choices including at least fixed rate no balloon; payment option ARM; standard ARM; balloon.

12. The method of claim 1, including providing a public portal and/or a private portal by which is received: a complaint relating to a property for which lender-side misconduct is being reported, and/or a request from a homeowner for help relating to a mortgage on the property.

13. The method of claim 1, including receiving, into the system that processes and applies the cap instructions, a payment by a homeowner, wherein the payment by the homeowner is received via a payment portal.

14. The method of claim 1, wherein the set of Cap Instructions comprises a first table comprising zip codes and a second table comprising servicers, wherein in the first table each zip code has a respective monthly cap associated therewith, and in the second table each servicer has a respective monthly cap associated therewith.

* * * * *